United States Patent [19]

Balling

[11] Patent Number: 5,682,571
[45] Date of Patent: Oct. 28, 1997

[54] RECYCLABLE CAMERA

[75] Inventor: Edward Norman Balling, Rochester, N.Y.

[73] Assignee: Eastman Kodak Company, Rochester, N.Y.

[21] Appl. No.: 620,617

[22] Filed: Mar. 22, 1996

Related U.S. Application Data

[60] Provisional application No. 60/001,305, Jul. 20, 1995.
[51] Int. Cl.$^6$ .................................................. G03B 17/02
[52] U.S. Cl. ............................................ 396/538; 396/539
[58] Field of Search .................................... 396/538, 539

[56] References Cited

U.S. PATENT DOCUMENTS

| | | |
|---|---|---|
| 2,378,406 | 6/1945 | Harris . |
| 3,906,535 | 9/1975 | Takahama et al. ............... 354/288 |
| 4,109,264 | 8/1978 | Pizzuti et al. ................... 396/539 |
| 4,855,774 | 8/1989 | Ohmura et al. .................. 354/203 |
| 4,896,178 | 1/1990 | Ohmura et al. ................ 354/145.1 |
| 4,954,858 | 9/1990 | Ohmura et al. ................ 354/145.1 |

FOREIGN PATENT DOCUMENTS

| | | |
|---|---|---|
| 1-57738 | 4/1989 | Japan . |
| 1-57740 | 4/1989 | Japan . |
| 1-128242 | 9/1989 | Japan . |
| 5-188444 | 7/1993 | Japan . |
| 6-202219 | 7/1994 | Japan . |

Primary Examiner—David M. Gray
Attorney, Agent, or Firm—Peter J. Bilinski; Robert Luke Walker

[57] ABSTRACT

A recyclable camera having a removable film door which provides access to each of the film cassette and battery compartments to allow sequential but not simultaneous removal of the film cartridge and the battery from the camera. In a preferable arrangement, the battery compartment and the film cassette compartments are orthogonally arranged so that the film cassette can be removed from the cassette compartment through an open end, and the battery can then be removed from the battery compartment through an open end through the film cassette compartment after the film cassette has been removed from the camera.

15 Claims, 9 Drawing Sheets

RECYCLABLE CAMERA

CROSS-REFERENCE TO RELATED APPLICATIONS

Reference is made to and priority claimed from U.S. Provisional application Ser. No. US 60/001,305filed 20 Jul. 1995, entitled RECYCLABLE CAMERA.

Reference is made to commonly assigned copending application Ser. No. Ser. No. 08/620,429, entitled:RECYCLABLE CAMERA, co-filed herewith in the name of Edward N. Balling.

FIELD OF THE INVENTION

The invention relates generally to the field of photography, and in particular to an improved recyclable camera. More specifically, the invention relates to a camera having a releasably attachable film door member to allow sequential but not simultaneous removal of the battery and the film cartridge.

BACKGROUND OF THE INVENTION

Recyclable cameras, such as the so-called "single use" or "one-time use" cameras, are becoming more widely known in the photographic field. In these cameras, a roll of prewound unexposed film contained within a lighttight chamber of the camera is advanced into a film cartridge contained within another chamber of the camera as exposures are taken by the user. The camera, along with the contained film cartridge, is returned after all of the exposures are taken to the photofinisher who removes the film cartridge for processing and passes the camera body to a recycler. Many single-use cameras are also provided with an electronic flash assembly, including a battery which is also recycled.

It is preferred that the flash battery be removed by the photofinisher prior to recycling of the above type cameras at the time the film cartridge is removed for processing. Typical prior art cameras, however, position the flash battery in a separate lighttight compartment which must be independently opened to access the battery requiring additional time and effort. Therefore, a number of cameras are returned to the recycler with the battery still present in the camera body. It is most desirable that the battery be removable from the camera with a minimum of effort to promote the recycling process.

SUMMARY OF THE INVENTION

The present invention is directed to overcoming one or more of the problems set forth above. Briefly summarized, according to one aspect of the present invention, there is provided a camera comprising a body section having a battery chamber for containing a battery and a film cartridge chamber for containing a film cartridge, is characterized in that:

the battery chamber is positioned orthogonally to said cartridge chamber and an opening is provided between the two chambers whereby after said film cartridge is removed from the cartridge chamber a battery can be removed from the battery chamber by moving the battery into the cartridge chamber.

According to another aspect of the present invention, there is provided a method of using a camera having a film cartridge chamber for storing a film cartridge and a battery chamber for storing a battery, said chambers being substantially orthogonally arranged relative to one another and each having an open end covered by a door member, comprising the steps of:

aligning the open end of said film cartridge chamber in a downward vertical position;

opening the door member covering the open end of the film cartridge chamber, thereby allowing the film cartridge to drop from said the film cartridge chamber; and rotating said camera until the open end of said battery chamber is aligned in a downward vertical position, allowing the battery to drop from the battery chamber, wherein opening said door member uncovers each of said open ends.

These and other aspects, objects, features and advantages of the present invention will be more clearly understood and appreciated from a review of the following Detailed Description of the Preferred Embodiments and appended Claims, and by reference to the accompanying drawings.

DETAILED DESCRIPTION OF THE INVENTION

The following description refers to a single preferred embodiment according to the present invention. It should be readily apparent that other useful embodiments employing the concepts taught by this invention are easily imagined and therefore the following description should not be specifically limited to the preferred embodiment.

Figure 1:
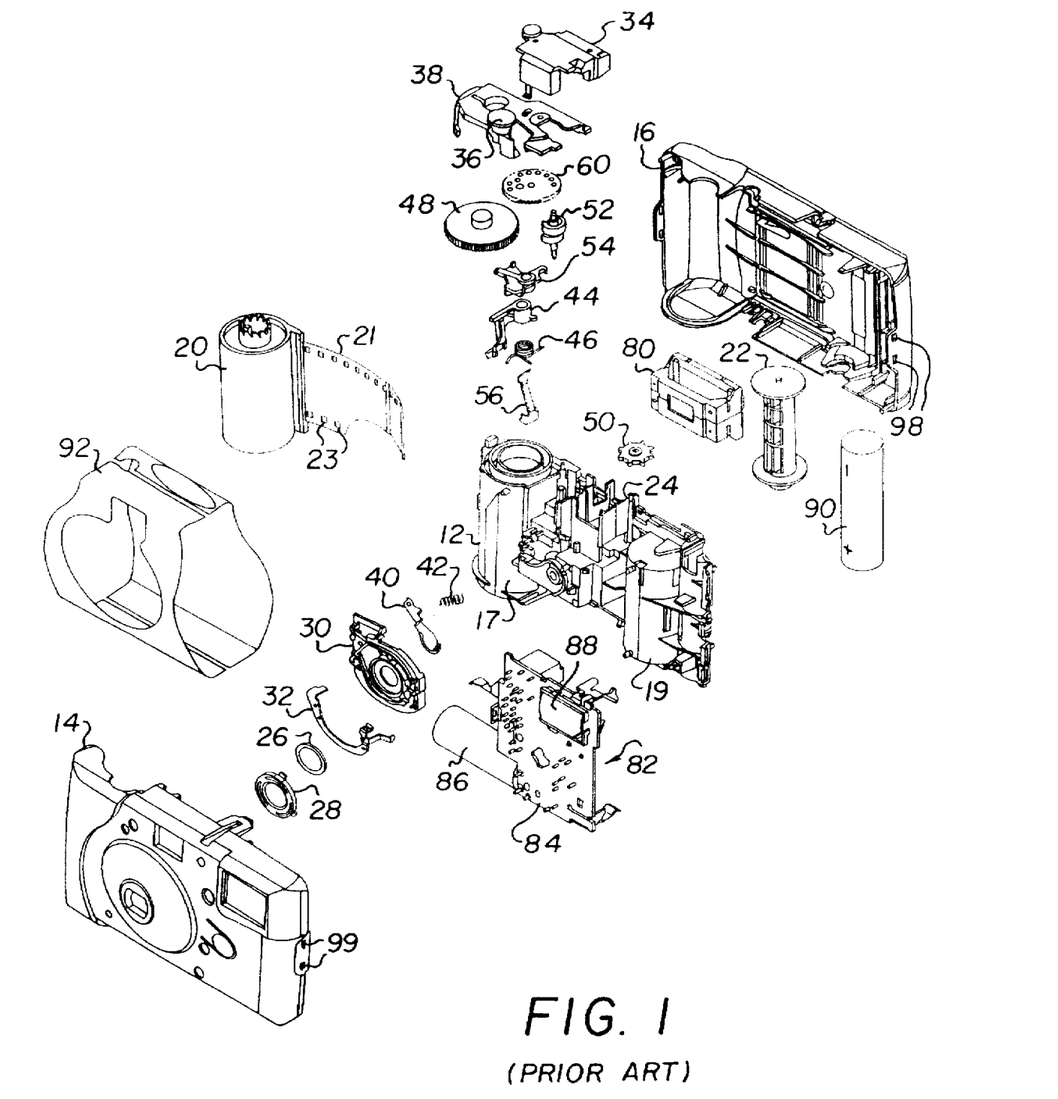
FIG. 1 is an exploded front perspective view of a recyclable camera found in the prior art.
Figure 2:
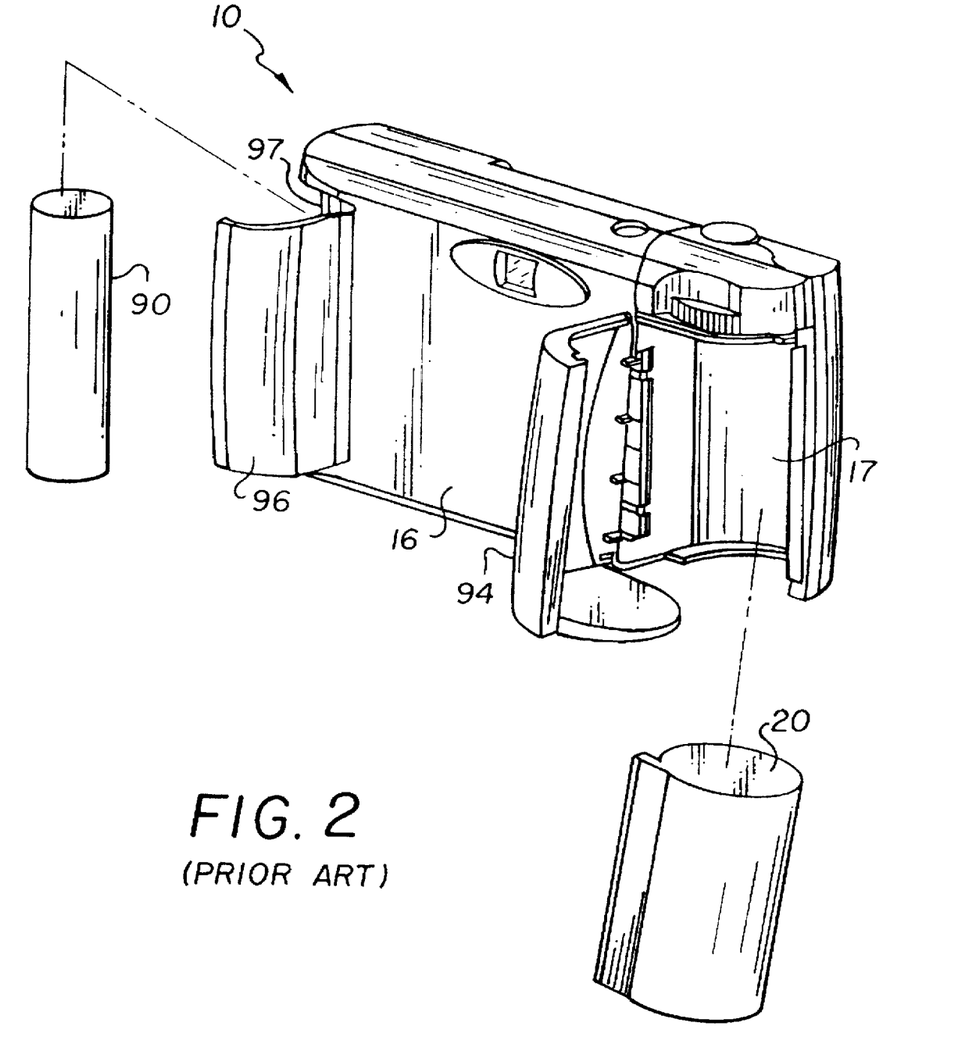
FIG. 2 is a rear perspective view of the assembled camera of FIG. 1.

In order to more clearly articulate the problems solved by the present invention, however, it is useful to refer to a recyclable camera according to the prior art. Referring to FIGS. 1 and 2, a typical prior art single-use camera 10 is shown comprising a main body 12, a front cover 14 which is attached to the front of the main body, and a rear cover 16 that is attached to the rear of the main body. Each of the main body 12, the front cover 14 and the rear cover 16 are preferably molded plastic parts.

The main body 12 includes a pair of formed semi-cylindrical chambers 17, 18 for retaining a film cartridge 20 and a take-up spool 22, respectively. The chambers 17, 18 are oppositely disposed relative to an exposure chamber 24 and each contain an open rear side. The main body 12 additionally supports a number of camera components which are attached thereto prior to the attachment of the covers 14, 16 which sandwich the body. In brief, these components include a taking lens 26 which is attached to the front of the main body 12 by means of a retainer 28 and a support plate 30, sandwiching the lens element therebetween. A contact switch 32 is also attached to one side of the support plate 30. Other components attached to the body include a plastic viewfinder 34; a shutter mechanism consisting of a keeper plate 38 having a depressible shutter release button 36 for tripping a shutter blade 40, which is biased by a spring 42 via a high-energy lever 44 which is also biased by a helical spring 46; a film advancing and metering mechanism consisting of a film winding knob 48 which engages the spool of a loaded film cartridge 20, a sprocket 50 for engaging edge perforations of a filmstrip 21 having a spring biased portion extending into a rotatable cam 52 which engages a metering lever 54 biased by a spring 56, the cam having an extending portion 58 for contacting the teeth of a frame counter 60; a light baffle 80 which is mounted to the rear of the body in the exposure chamber 24; and an electronic flash assembly 82 including a circuit board 84, capacitor 86, and flashhead 88, which is powered by a battery 90 which according to this particular embodiment is vertically retained in a battery compartment 97, best seen in FIG. 2 and directly adjacent the film roll chamber 18.

The rear cover 16 is preferably attached to the front cover 14 by engagement snaps 98 which engage corresponding holes 99 in the front cover 14. Alternately, or in addition to the engagement snaps 98, the covers 14, 16 can be spot welded ultrasonically, or other securing means may be employed. The main body 12 is supported between the two covers 14, 16.

Referring specifically to FIG. 2, the rear cover 16 also includes a first break-away door 94 adjacent the open rear side of the film cartridge chamber 17 to allow the removal of the film cartridge 20 by the photofinisher after all of the exposures have been taken by a user. In this particular prior art camera, the rear cover 16 also includes a second break-away door 96, similarly located adjacent the battery compartment 97 and oppositely disposed relative to the first break-away door 94 adjacent the film roll chamber 18, FIG. 1. In the embodiment shown, each of the first and second break-away doors 94, 96 include a weakened area which can be folded open to reveal the open rear side of the cartridge chamber 17 and the battery compartment 97 to allow separate removal of the film cartridge 20 and the flash battery 90, respectively, after the engagement snaps 98 have been disengaged from the corresponding holes 99. In order to prevent consumers from prematurely opening the engagement snaps and the camera 10, the snaps 97 are typically designed to be opened by using a special tool which is provided to the photofinisher (not shown). Details relating to the assembly of the covers 14, 16 and the first and second breakable doors 94, 96 are described in copending and commonly assigned U.S. Ser. No. 08/327,250 filed Oct. 21, 1994 and entitled: COVER ASSEMBLY FOR CAMERA.

While the described break-away doors 94, 96 provide relatively easy access to the film cartridge 20 and the battery 90 respectively, it has been shown, however, that photofinishers often utilize other means to expedite the opening of a camera such as the one presently described. Rather than using a special tool (not shown) to disengage the engagement snaps 98 or spot welds (if spot welds rather than engagement snaps are employed), one such method is to impact the edge of the camera body containing the film cartridge 20 against the edge of a table to effectively crack the camera 10 open. This form of opening, though effective in allowing removal of the film cartridge 20, usually also cracks the plastic film cartridge chamber 17. As previously noted, it is a primary goal to recycle the cameras. The cracking of the main body 12, however, requires replacement of the main body 12 and either the removal of the attached photographic components for possible retrofitting on a replaced main body 12, or scrapping the photographic components along with the main body. This definitely curtails any legitimate recycling effort.

An additional consideration occurs because the film cartridge 20 and the flash battery 90 are oppositely situated in cameras of the described type. The photofinisher is primarily interested in removing the film cartridge for film processing, and therefore may not bother to separately open the second break-away door to remove the flash battery 90 from the camera 10, even though it is preferred that the battery be removed by the photofinisher at the time of processing.

The Present Invention

The particular embodiment according to the present invention will now be described by referring to the accompanying drawings in general. For clarity, similar reference numerals will be used to refer to those components previously referred to above in the camera described in FIGS. 1 and 2.

Figure 3:
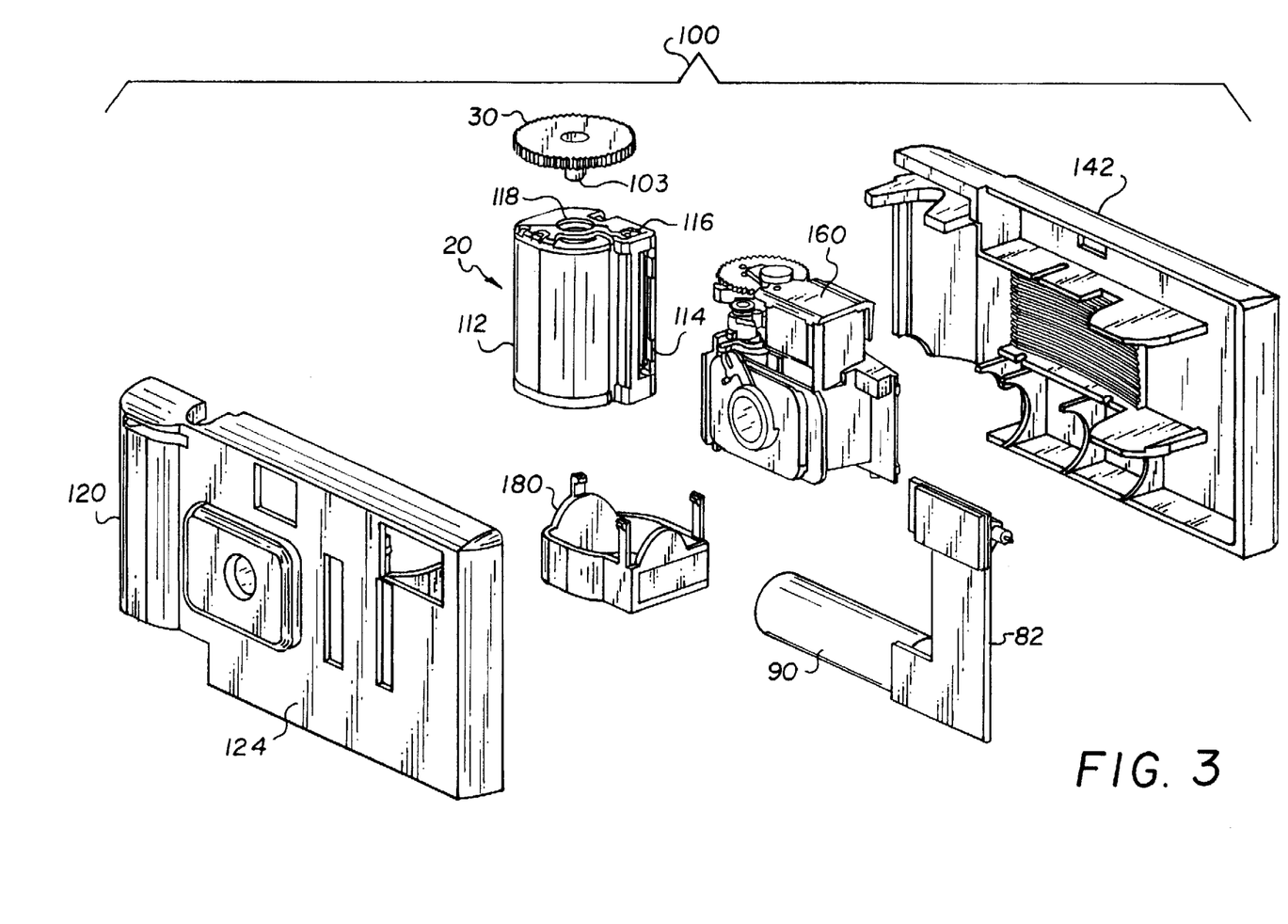
FIG. 3 is an exploded perspective view of a camera according to a preferred embodiment of the present invention.

Referring to the exploded assembly view of FIG. 3, there is shown a "single use" or "one-time use" camera 100 in accordance with a preferred embodiment of the present invention. The camera 100 includes a front cover portion 120 and a rear cover portion 142 which are joined together to form a camera body 102, FIG. 12. A photographic module assembly 160 is situated or sandwiched between the front and rear cover portions 120, 142, along with an electronic flash assembly 82 and a film cartridge 20. A film winding knob or thumbwheel 30 includes an extending drive portion 103 for engaging a rotatable film spool of the film cartridge 20 as is commonly known to advance a filmstrip 21 contained therein, and a film door member 180 is releasably attached to an assembled camera 100 for retaining and accessing the film cartridge 20 which is situated within a defined chamber of the camera. Each of the above components will now be described in greater detail.

Figure 4:
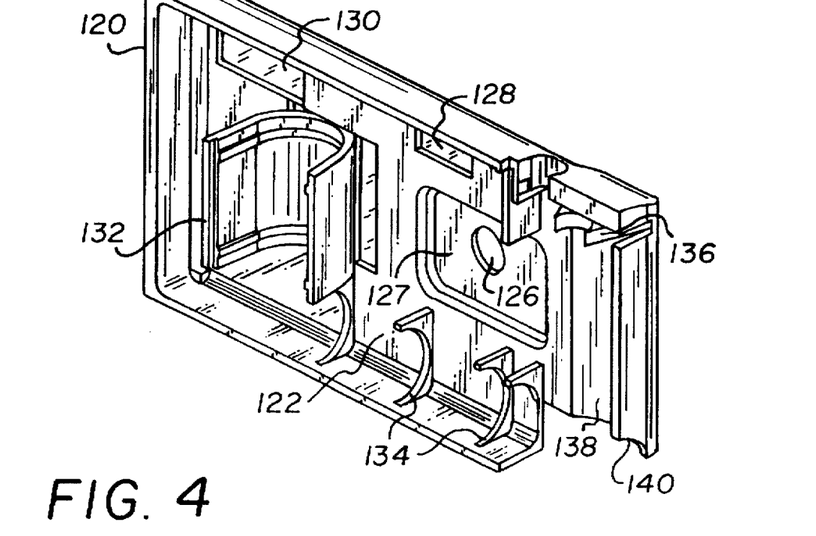
FIG. 4 is a back perspective view of the front cover portion of the camera shown in FIG. 3.

Turning now to FIGS. 3 and 4, the front cover portion 120 is made from a molded plastic and includes a inner surface 122 and an outer surface 124, best shown in FIG. 3. The front cover portion 120 also includes openings for components: a taking lens opening 126, a viewfinder opening 128, and a flash assembly opening 130. A portion 127 of the inner surface 122 immediately adjacent the taking lens opening 126 is recessed inwardly. A semi-cylindrical light shielding member or sleeve 132 extends outwardly from the inner surface 122 on one side of the taking lens opening 126 for light-tightly sealing an unexposed film roll 107, FIG. 9, as described in greater detail below. In addition, a set of curved battery retaining members 134 also extend from the inner surface 122 beneath the taking lens opening 126 and the sleeve 132 to partially define a battery compartment 110, FIG. 12, while an inwardly curved and semi-cylindrical film cartridge retaining portion 138 is provided on the other side of the taking lens opening 126 opposite the sleeve member 132 for defining a portion of a film cartridge chamber 104, FIG. 12. A cutout section 140 is provided beneath the film cartridge retaining portion 138 and adjacent the end of the battery compartment 110, FIG. 12, for accommodating the film door member 180. A thumbwheel retaining section 136 is also provided above the cartridge retaining portion 138 for positioning the thumbwheel 30 relative to the rotatable film spool of the film cartridge 20.

Figure 5:
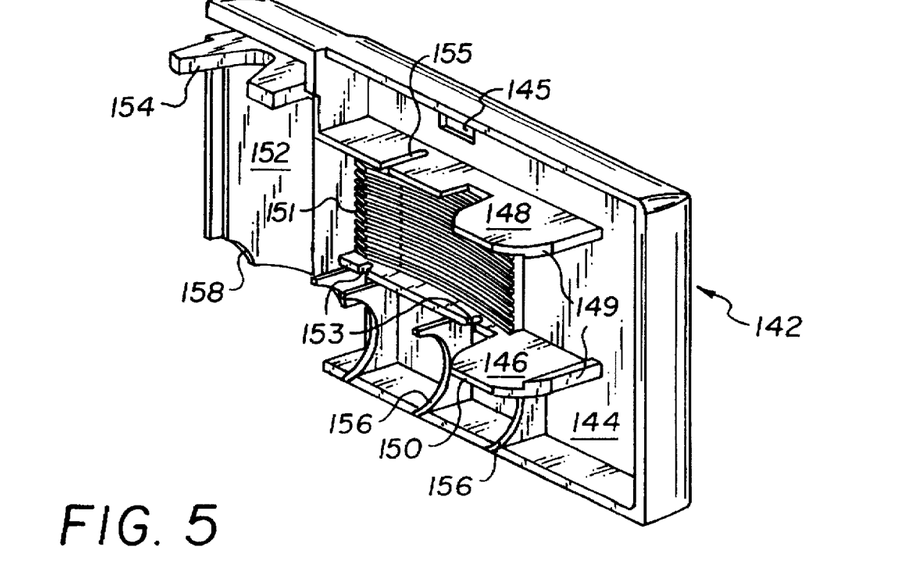
FIG. 5 is a front perspective view of the rear cover portion of the camera shown in FIG. 3.

Referring now to FIGS. 3 and 5, the rear cover portion 142 also includes an inner surface 144 and a outer surface (not shown). The inner surface 144 includes a film roll holding portion or chamber 146 on one side having a spacing defined by a pair of horizontally disposed parallel supports 148, 150 large enough to support a film roll 107, FIG. 9, as described in greater detail below. An inwardly curved semi-cylindrical film cartridge retaining portion 152 is provided on the opposite side of the cover 142 which defines a portion of the film cartridge chamber 104, FIG. 12.

Adjacent to the bottom of the rear cover portion 142 are a number of curved battery retaining members 156, which are preferably equally spaced from one another and located directly below the lower support 150 so as to define, along with the retaining members 134 of the front cover section 120, a batter compartment 110. The rear cover portion 142 also includes a cutout portion 158, similar to the cutout portion 140 of the front cover section 120, beneath the semi-cylindrical film cartridge retaining portion 152 for accommodating the film door member 180.

Figure 12:
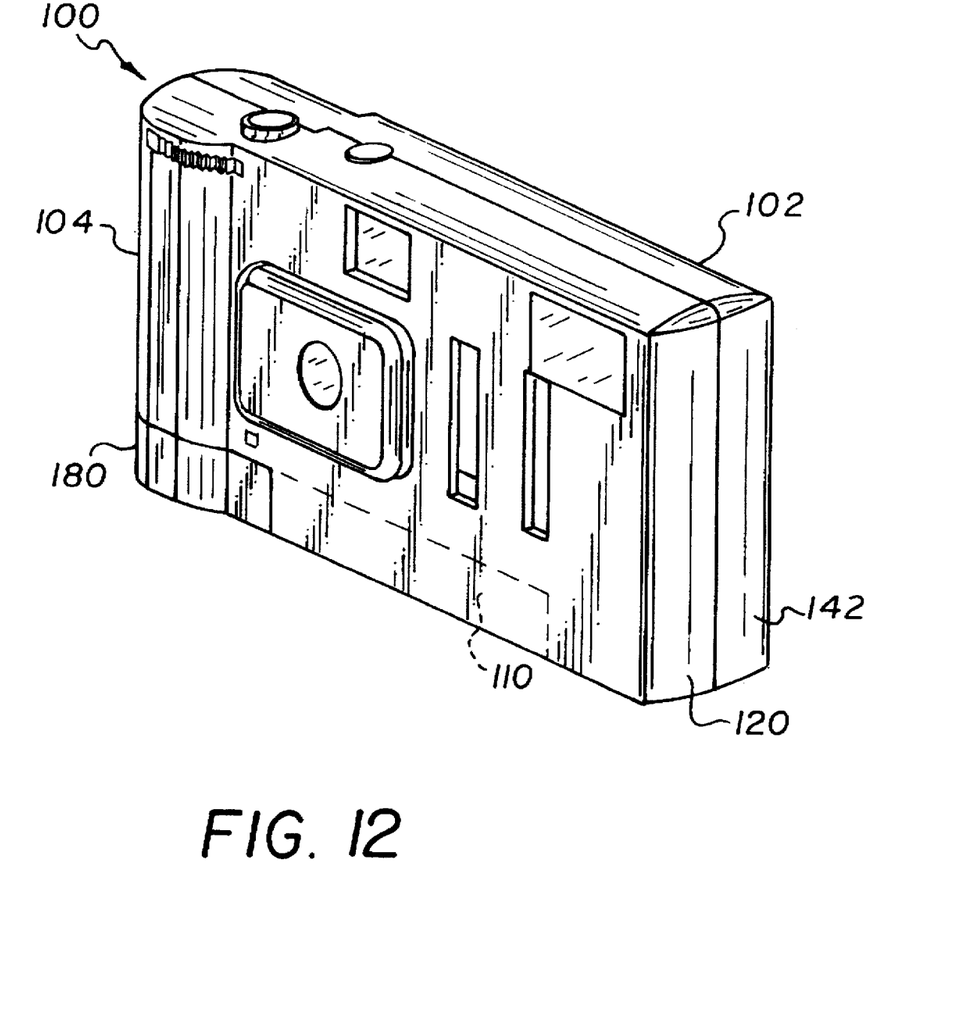
FIG. 12 is a front perspective view of an assembled camera according to the present embodiment.

When assembled together in a known manner as shown in FIG. 12, the front and rear cover portions 120, 142 define a camera body 102, having a film cartridge chamber 104 defined by the corresponding semi-cylindrical sections 138, 152, a film roll chamber 146 defined by supports 148 and 150 of the rear cover portion 142 which is then covered or shielded by sleeve 132 of the front cover portion 120, and a battery compartment 110 defined by the corresponding sets of retaining members 134, 156. Each of the film cartridge chamber 104 and the battery compartment 110 have respective orthogonal open ends 106, 111, FIG. 14, defined by the cutout portions 140, 158. The film door member 180, which covers each of the open ends 106, 111, FIG. 14, fits in a manner described below. The supports 148, 150 and the inward recess 127 of the front cover section 120 adjacent the taking lens opening 126 also provide spacing for positioning and accommodating the photographic module assembly 160, which will now be described in greater detail.

Figure 6:
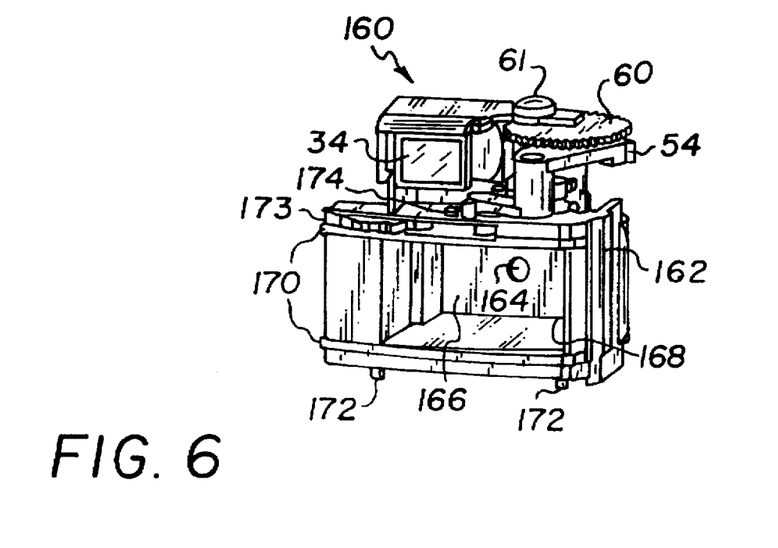
FIG. 6 is a rear perspective view of a photographic module assembly used in the camera shown in FIGS. 3–5.
Figure 7:
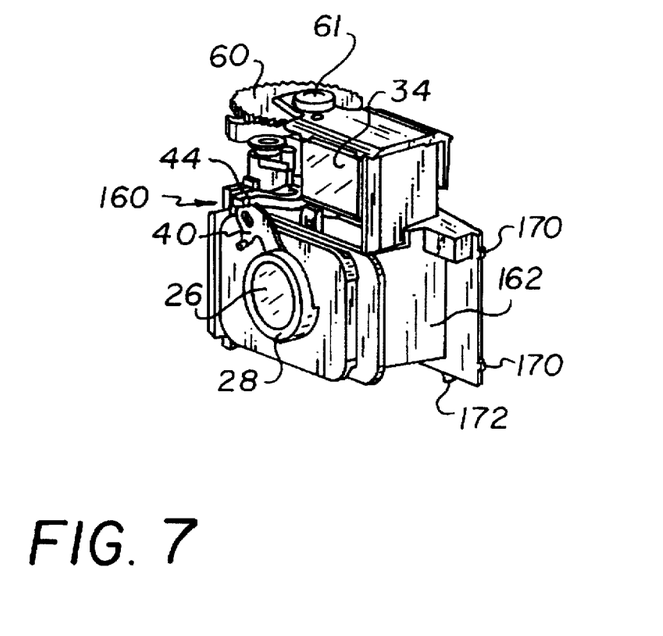
FIG. 7 is a front perspective view of the photographic module assembly shown in FIG. 6.

Referring now to FIGS. 6 and 7, the photographic module assembly 160 comprises a unitary plastic body 162 having a defined exposure chamber 166 which includes a front opening 164 and a rear opening 168 166. The rear opening 168 is considerably larger than the front opening 164. A pair of parallel film rails 170 border the top and bottom sides of the rear opening 168 and are spaced a distance at least equivalent to the width of the image capture area of a filmstrip 21.

Similar to the main body or frame portion 12 of the prior art camera 10, a number of photographic components are attached to the exterior of the plastic body 162 of the module assembly 160 including a taking lens 26 which is attached to the front side of the body 162 by a retainer 28 over the front opening 164. A shutter blade 40 includes a masking portion (not shown) which covers the front opening 164 and is tripped by a depressible shutter release button 36, FIG. 10, which sets into motion a high energy lever 44 in a manner commonly known to engage the shutter blade 40. A plastic viewfinder 34 is also attached to the top of the photographic module assembly 160, adjacent to the shutter release button 36, FIG. 10, as well as a rotatable frame counter 60 having a magnifier optic 61 covering a portion of the counter. The counter 60 is advanced in a known manner by a metering lever 54. An attached metering pawl 173 on the rear of the body 162 engages edge perforations (not shown) of the filmstrip 21, FIG. 10, in a manner similar to that of the sprocket 50 used in the prior art camera 10 as the filmstrip passes the defined exposure chamber 166. The above noted photographic components and their functions are commonly known in the field of photography; and therefore, their brief description is merely for completeness.

In FIGS. 8–11, a series of sequential partial assembly views of the presently described camera 100 are illustrated, though the camera itself is not assembled in this manner. That is, the described views assist in describing the positioning of the various components of the camera 100.

Figure 8:
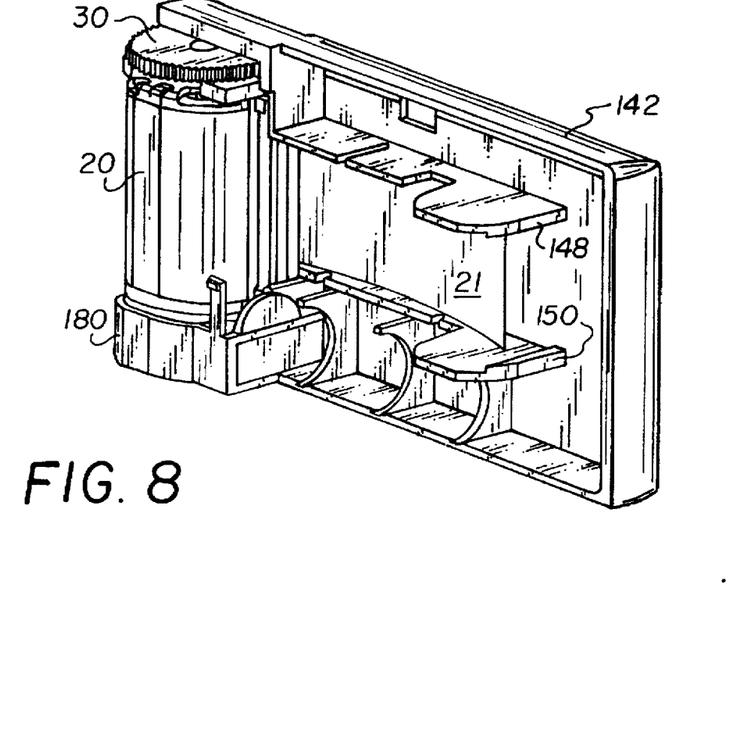
FIG. 8 is the front perspective view of the rear cover portion of FIG. 5, showing the positioning of a film cartridge in the camera.

Turning first to FIGS. 3, 5 and 8, a film cartridge 20 is shown positioned in the film cartridge retaining portion 152 of the rear cover portion 142 of the camera 100. As noted above and when fully assembled, the corresponding film cartridge retaining portions 138, 152 of the front and rear cover portions 120, 142 form the film cartridge chamber 104, FIG. 12.

The film cartridge 20, according to this particular embodiment, includes a main body section 112 having an interior rotatable film spool 118 which is capable of thrusting a leading portion of the filmstrip 21 from the confines of the cartridge as well as an active light seal or lock 116 which can be opened to open a film exit door 114 of the cartridge. Such thrusting type film cartridges are described in commonly assigned U.S. Pat. No. 5,359,378, among others. It will be readily apparent, however, that conventional 35 mm film magazines can also be used in a recyclable camera according to the present invention.

The thumbwheel 30 has an exterior portion (not shown) which extends through respective slots (not shown) in each of the front and rear cover portions 120, 142 to allow the thumbwheel to advance the filmstrip 21 in a manner commonly known from the film roll chamber 108 through the rotation of the drive member 32 with the film spool 118 of the film cartridge 20. The thumbwheel 30 is supported by the retaining portion 154. When fully assembled with the front cover portion 120, the retaining portion 134 cooperates with portion 154 to support the thumbwheel 30, each of the retaining portions having a curved receiving end for accommodating the drive portion 103.

The film door member 180 includes extending prongs 182 which engage the inner surfaces 122, 144 of the front and rear cover portions 120, 142 of the assembled camera 100 and is placed in the cutout portions 140, 158 to coincide with the shape of the camera 100. The door member 180 is slightly undersized relative to the cutout portions so that the prongs 184 are positively engaged with the inner surfaces of the front and rear cover portions. When fully assembled, FIG. 12, the door member 180 covers each of the orthogonal openings 106, 111 defined by the film cartridge chamber 104 and the battery compartment 110.

Figure 9:
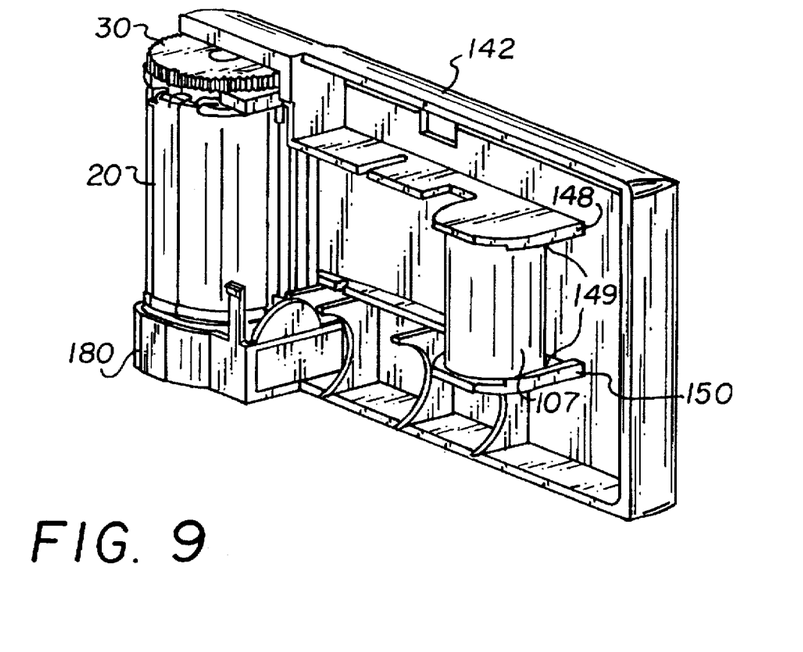
FIG. 9 is the front perspective view of FIG. 8 showing a portion of a filmstrip extending from the cartridge into the film transport path defined by the rear cover portion.

Referring now to FIG. 9, an unexposed film roll 107 is retained in the film roll holding portion 146 of the rear cover portion 142 between the top and bottom supports 148, 150, and is prevented from clockspringing by means of a pair of retaining circumferential edge surfaces 149 included on the upper and lower supports. The film roll 107 typically can be created by accessing the exterior drive portion and rotating the film spool 118 of the cartridge 20 to thrust the leading portion of the filmstrip 21 out of the cartridge 20 in any convenient manner either while the cartridge is within or exterior to the camera 100 preferably in a darkened environment. The spacing between the upper and lower supports 148, 150 is preferably adequate to prevent the unexposed film roll 107 from telescoping.

Figure 10:
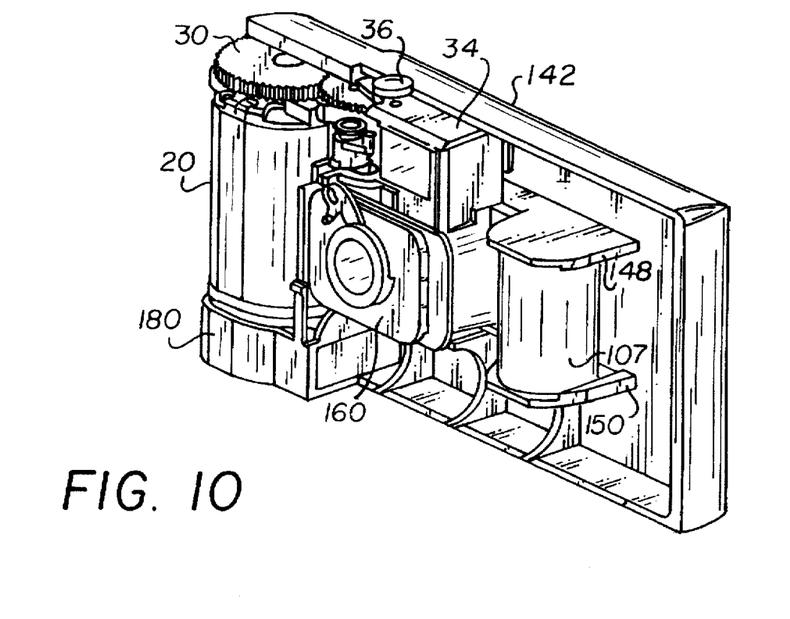
FIG. 10 is the front perspective view of FIGS 8 and 9 showing the positioning of the photographic module assembly relative to the rear cover portion of the camera.
Figure 11:
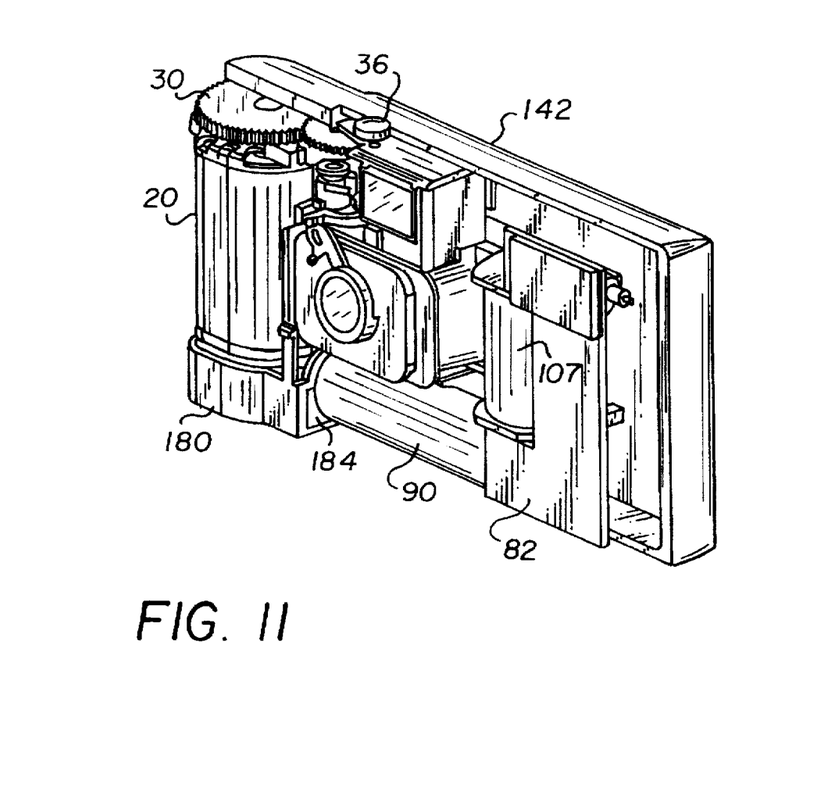
FIG. 11 is the front perspective view of the partially assembled camera of FIG. 10, with the addition of an electronic flash assembly.

FIGS. 10 and 11 illustrate the placement of a fully assembled photographic module assembly 160 within the camera 100. The photographic module assembly 160 preferably having all of the previously described components mounted thereto is aligned with the rear cover portion 142 of the camera 100 by aligning the two lower lug members 172 extending from the bottom of the body 162 with the locator slots 153 correspondingly provided in the lower support 150 and the upper pin 174 with the single locator slot 155 provided in the top support 148. This placement specifically aligns the film rails 170 with the rear platen 151 of a rear cover 142 when assembled to the camera 100, and also specifically aligns the distance between the taking lens 26 mounted to the front of the photographic module assembly with the filmstrip 21 as the front of the photographic module assembly is sized to fit within the recess 127 of the front cover section 120 when assembled thereto while the attached viewfinder 34 is aligned with the viewfinder openings 128, 145 of the front and rear cover portions 120, 142.

In addition to the positioning of the photographic module assembly, FIG. 11 also illustrates the relative positioning of the electronic flash assembly 82 within the camera 100, including the flash battery 90 in the battery compartment 110 as supported by the retaining members 156 of the rear cover portion 142.

In this particular embodiment, the flash battery 90 is shown in the location previously occupied by the capacitor of the prior art camera 10, FIGS. 1, 2. The flash capacitor of the present camera is not shown, for clarity.

As previously noted, the retaining members 134 of the front cover portion 120 and the rear cover portion 142 retain the battery 90 and also define the battery compartment 110 when the camera 100 is finally assembled. The battery compartment 110 includes an open end 111 at the cutout portions of the front and rear cover portions 120, 142 which extends through the bottom of the film cartridge chamber 104.

Figures 13, 14:
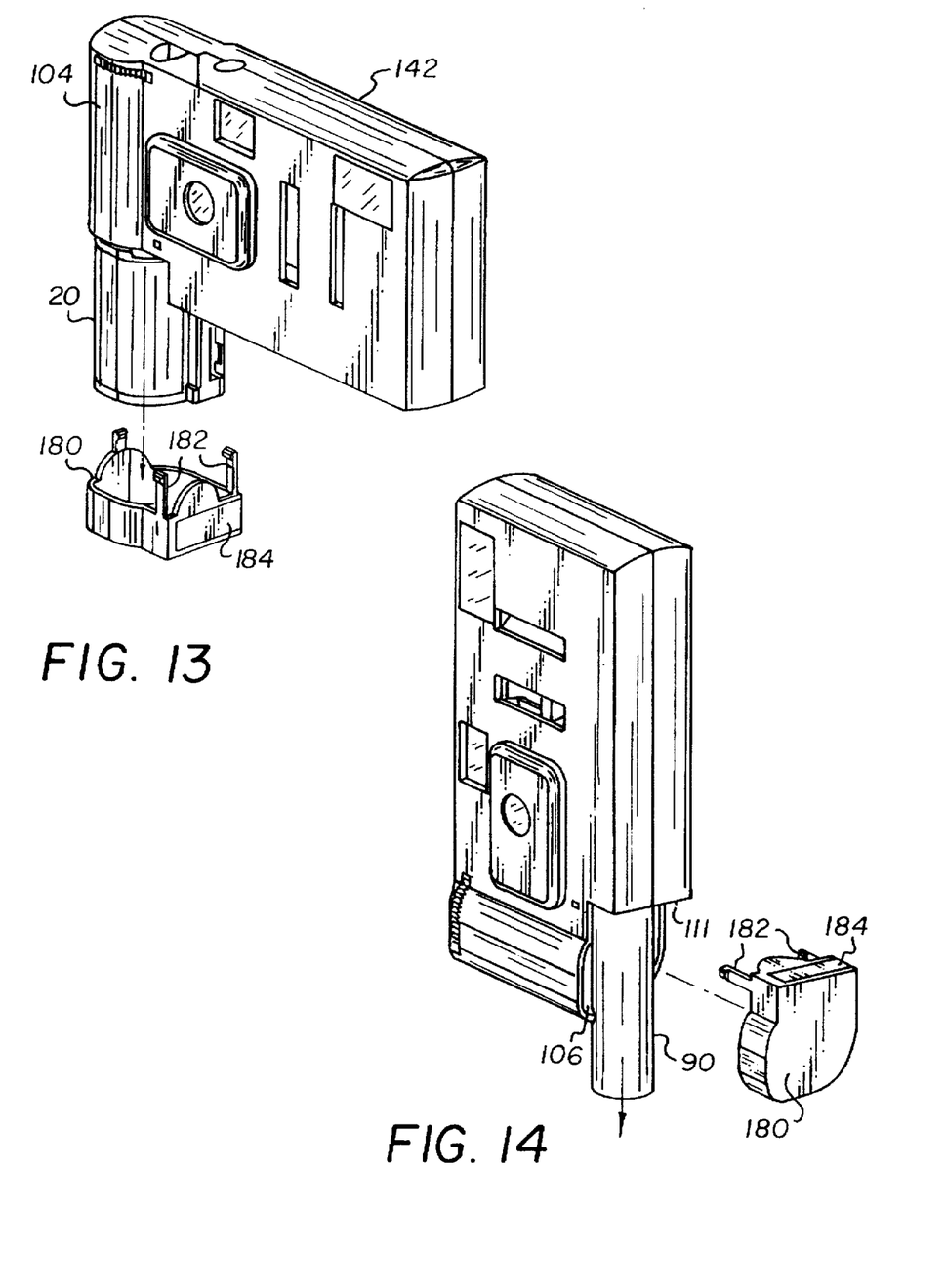
FIG. 13 is the front perspective view of the camera of FIG. 12 showing the removal of the film cartridge from the film cartridge chamber of the camera.
FIG. 14 is a rotated front perspective view of the camera shown in FIGS. 12 and 13, illustrating the removal of the flash battery from the camera through the film cartridge chamber.

Referring now to FIGS. 13–14, the sequential removal of the film cartridge 20 and the flash battery 90 from an assembled camera 100 of the present embodiment will now be described.

After all of the exposures have been taken by a user, the camera 100 can be taken to a photofinisher for removal of the film cartridge 20 and the flash battery 90. The camera 100 is preferably oriented in a normal position; that is, a position in which the bottom surface of the camera body 102 faces downward. The film door member 180 is removed by simultaneously applying inward pressure to the retaining prong members 182 while simultaneously pulling the door member 180 from the camera body 102, thereby separating the retaining prong members with the inner surfaces of the front and rear cover portions 120, 142, respectively. The removal of the film door portion 180 exposes the opening 106 of the film cartridge chamber 104, the film cartridge 20 being free to drop from the chamber 104 through the opening 106 for removal from the camera 100.

With the film door member 180 still removed from the camera body 102, FIG. 12, the flash battery 90 can also be removed from the battery compartment 110 by rotating the camera 100 approximately 90 degrees about the optical axis in a clockwise direction until the battery compartment 110 is oriented vertically with the opening 111 facing in a downward direction, as seen from the FIG. 14. The battery 90 can then easily slide from the confines of the battery compartment 110 through the spacing of the film cartridge chamber 104 and out of the camera body 102 through the opening 111. As opposed to the prior art camera 10, there is no separate battery door to open so that the flash battery 90 and the film cartridge 20 can be removed in a sequential operation requiring very few manipulative steps.

Although the door member 180 has convenient releasing means for allowing removal of the film cartridge 20 and the battery 90, respectively, it should be apparent that the photofinisher may still elect to crack the camera 100 open by impacting the side of the camera having the cartridge 20 in a manner previously described. This form of opening the camera, however, should be of less consequence in that the front and rear covers solely define the film cartridge chamber 104. During the recycling phase of the camera 100, the front and rear cover portions 120, 142 are typically not reused, but rather are pulverized and reground. Because the photographic module assembly 160 does not define any portion of the film cartridge chamber 104, it is less likely to be damaged by the photofinisher, and more likely to be reused along with any attached photographic component.

The camera 100 can therefore be reassembled using the original photographic module assembly 160 in the manner previously described above as attached to new front and rear cover portions 120, 142 along with the electronic flash assembly 82. After the cover portions 120, 142 have been assembled in a known manner, a fresh battery 90 can be then placed into the battery compartment 110 through the opening 111 and a film cartridge 20, such as that previously described, can then be placed into the cartridge chamber 104 through the opening 106. Finally, the film door member 180 can be attached using prong members 182, thereby covering both of the orthogonally arranged chambers 104, 110 and light-tightly sealing the camera 100. In addition, the placement of the film door member 180 initiates electrical contact by means of the conductive strip or conductor 184 which electrically contacts the end of the battery 90.

The invention has been described with reference to a preferred embodiment. However, it will be appreciated that variations and modifications can be effected by a person of ordinary skill in the art without departing from the scope of the invention.

| PARTS LIST for FIGS. 1–14 | |
|---|---|
| 10 | camera |
| 12 | main body or frame |
| 14 | front cover |
| 16 | rear cover |
| 17 | film cartridge chamber |
| 18 | film roll chamber |
| 20 | film cartridge |
| 21 | filmstrip |
| 22 | take-up spool |
| 23 | edge perforations |
| 24 | exposure chamber |

-continued

PARTS LIST for FIGS. 1–14

| | |
|---|---|
| 26 | taking lens |
| 28 | lens retainer |
| 30 | support plate |
| 32 | contact switch |
| 34 | viewfinder |
| 36 | shutter release button |
| 38 | keeper plate |
| 40 | shutter blade |
| 42 | spring |
| 44 | high-energy lever |
| 46 | helical spring |
| 48 | film winding knob |
| 50 | sprocket |
| 52 | cam |
| 54 | metering lever |
| 56 | spring |
| 58 | extending portion |
| 60 | frame counter |
| 80 | light baffle |
| 82 | electronic flash assembly |
| 84 | circuit board |
| 86 | capacitor |
| 88 | flash head |
| 90 | battery |
| 92 | label |
| 94 | first break-away door |
| 96 | second break-away door |
| 97 | battery compartment |
| 98 | engagement snaps |
| 99 | holes |
| 100 | camera |
| 102 | camera body |
| 103 | drive portion |
| 104 | cartridge chamber |
| 106 | opening |
| 107 | film roll |
| 108 | film roll chamber |
| 110 | battery compartment |
| 111 | opening |
| 112 | body |
| 114 | film exit door |
| 116 | light lock |
| 118 | rotatable film spool |
| 120 | front cover portion |
| 122 | inner surface |
| 124 | outer surface |
| 126 | taking lens opening |
| 127 | recessed portion |
| 128 | viewfinder opening |
| 130 | flash reflector opening |
| 132 | light sleeve |
| 134 | battery retaining members |
| 136 | thumbwheel retaining portion |
| 140 | cutout portion |
| 142 | rear cover portion |
| 144 | inner surface |
| 145 | opening |
| 146 | film roll holding portion |
| 148 | top support |
| 149 | film retaining edges |
| 150 | bottom support |
| 151 | rear platen |
| 152 | film cartridge retaining portion |
| 154 | thumbwheel locating portion |
| 156 | battery retaining members |
| 158 | cutout portion |
| 160 | photographic module assembly |
| 162 | body |
| 164 | front opening |
| 166 | exposure chamber |
| 168 | rear opening |
| 170 | film rails |
| 172 | lugs |
| 174 | pin |
| 180 | film door member |
| 182 | prongs |
| 184 | battery terminal |

I claim:

1. A camera comprising a body section having a battery chamber for containing a battery and a film cartridge chamber for containing a film cartridge, is characterized in that:

said battery chamber is positioned orthogonally to said cartridge chamber and an opening is provided between the two chambers whereby after said film cartridge is removed from the cartridge chamber a battery can be removed from the battery chamber by moving the battery into the cartridge chamber; and said camera includes a door member for covering said opening, wherein said door member includes electrical contact means for contacting an end of a battery retained in said battery chamber.

2. A camera as recited in claim 1, wherein said door member includes means for releasably attaching to said camera body section.

3. A camera as recited in claim 2, wherein said releasable attachment means includes at least two flexible prong-like members depending from said door member for engaging said camera body section.

4. A camera comprising a cartridge chamber for containing a film cartridge and a battery chamber for containing a battery, is characterized in that:

said cartridge chamber has an opening to the battery chamber, whereby after a film cartridge is removed from the cartridge chamber through said opening a battery can be removed from the battery chamber by moving the battery into the cartridge chamber through said opening;

said camera includes an openable door member for covering said opening, said opening allowing sequential but not simultaneous removal of a film cartridge and a battery when said door member is opened, said door member including attachment means for releasably attaching said door member to said camera, said door member including electrical contact means for contacting with a battery inserted in said battery chamber when said door member is attached to said camera body.

5. A camera as recited in claim 4, wherein said film cartridge chamber is positioned orthogonally to said battery chamber.

6. A camera as recited in claim 5, wherein said opening defines an open end of said cartridge chamber and an open end of said battery chamber, said open ends being orthogonally arranged.

7. A camera as recited in claim 4, wherein said attachment means includes at least one pair of flexible hook-like members depending from said door member for engaging with a body portion of said camera to lighttightly secure said door member.

8. A camera for use with a film cartridge and a battery, said camera comprising:

a body section having a film cartridge chamber for containing the film cartridge, said film cartridge chamber defining a film cartridge chamber open end; a battery chamber for containing the battery, said battery chamber defining a battery chamber open end, said film cartridge chamber open end and said battery chamber open end being orthogonal; and a door member said door member covering said film cartridge chamber open end and said battery chamber open end, said door having a conductor disposed to electrically contact an end of said battery.

9. The camera of claim 8 wherein said film cartridge chamber and battery chamber open ends are sized to permit removal of the film cartridge from said film cartridge chamber and removal of the battery from said battery chamber by moving the battery through said film cartridge chamber.

10. The camera of claim 8 wherein said door member is releasably attached to said body section.

11. The camera of claim 10 wherein said film cartridge chamber allows said film cartridge to drop freely when said door member is released and said film cartridge chamber open end faces in a downward direction.

12. The camera of claim 11 wherein said battery chamber allows said battery to slide out when said door member is released, said film cartridge has been removed, and said battery chamber open end faces in a downward direction.

13. A method of using a camera comprising the steps of:
 releasing a door member, said releasing further comprising
  uncovering a film cartridge chamber open end,
  uncovering a battery chamber open end, and
  removing a conductor from electrical contact with a battery disposed in said battery chamber;
 aligning said camera such that said film cartridge chamber open end faces in a downward direction;
 allowing a film cartridge to drop from said film cartridge chamber;
 rotating said camera until said battery chamber open end faces in a downward direction; and
 allowing said battery to drop from said battery chamber.

14. The method of claim 13 further comprising, following said second allowing step, the steps of:
 placing a fresh battery in said battery compartment;
 placing an unexposed film cassette in said film supply chamber; and
 attaching a door member, said attaching further comprising
  covering a film cartridge chamber open end,
  covering a battery chamber open end, and
  placing a conductor in electrical contact with said battery disposed in said battery chamber.

15. The method of claim 14 further comprising the step of replacing front and rear cover portions of said camera.

* * * * *